United States Patent [19]

Lemelson

[11] 4,237,363
[45] Dec. 2, 1980

[54] BEAM WELDING APPARATUS AND METHOD

[76] Inventor: Jerome H. Lemelson, 85 Rector St., Metuchen, N.J. 08840

[21] Appl. No.: 765,597

[22] Filed: Feb. 4, 1977

Related U.S. Application Data

[63] Continuation-in-part of Ser. No. 572,143, Apr. 28, 1975, abandoned, which is a continuation-in-part of Ser. No. 523,865, Nov. 14, 1974, abandoned, which is a continuation-in-part of Ser. No. 506,887, Sep. 17, 1974, abandoned.

[51] Int. Cl.$^3$ .................... B23K 26/08; B23K 15/00
[52] U.S. Cl. ................... 219/121 LM; 219/121 EM
[58] Field of Search ..... 219/121 L, 121 LM, 121 EB, 219/121 EM

[56] References Cited

U.S. PATENT DOCUMENTS

| | | | |
|---|---|---|---|
| 3,304,403 | 2/1967 | Harper | 219/121 L |
| 3,417,223 | 12/1968 | Steigerwald | 219/121 EM |
| 3,585,350 | 6/1971 | Voytko | 219/121 LM |
| 3,644,698 | 2/1972 | Metcalfe et al. | 219/83 |
| 3,881,084 | 4/1975 | Boardsen | 219/121 LM |
| 3,974,016 | 8/1976 | Bondybey et al. | 219/121 LM |

FOREIGN PATENT DOCUMENTS

| | | | |
|---|---|---|---|
| 1176296 | 8/1964 | Fed. Rep. of Germany | 219/121 EB |
| 1565465 | 9/1969 | Fed. Rep. of Germany | 219/121 L |
| 1500197 | 9/1967 | France | 219/121 LM |

OTHER PUBLICATIONS

Anderson & Jackson, "Theory & Application of Pulsed Laser Welding", *Welding Journal*, 12/65, pp. 1018-1026.

*Primary Examiner*—Elliot A. Goldberg
*Assistant Examiner*—Keith E. George

[57] ABSTRACT

An apparatus and method are provided for welding portions of members disposed in edgewise abutment or overlapping relationship by means of a high intensity beam of radiation such as a laser beam or an electron beam generated by an electron gun. In one form, the two members are sheets of weldable material such as metal or plastic which are driven between aligned rolls or wheels into edgewise or overlapping abutment while one or more beams of radiations intersect either or both the members immediately in advance of or adjacent to the rolls or wheels. The combined effects of the force applied by the wheels and the heat of the beam serve to provide portions of the members welded together.

4 Claims, 8 Drawing Figures

U.S. Patent  Dec. 2, 1980  4,237,363
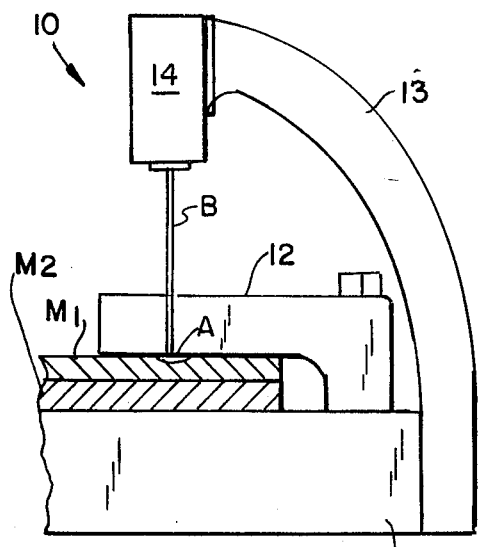
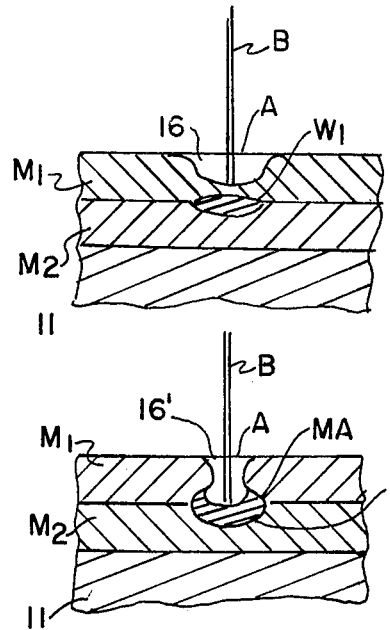
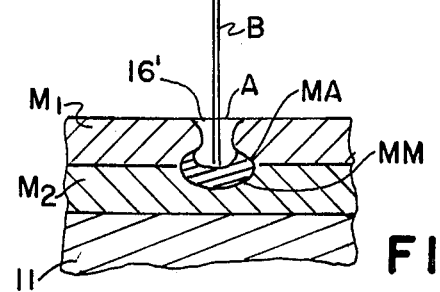
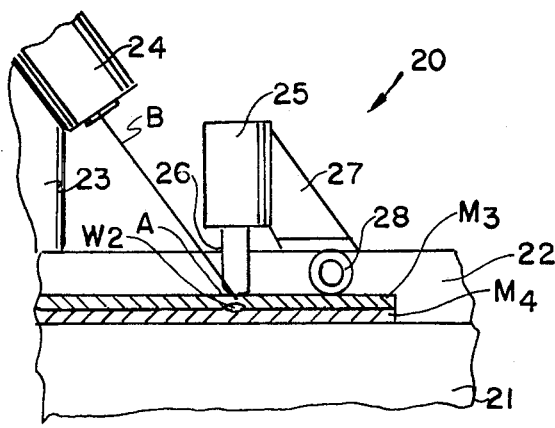
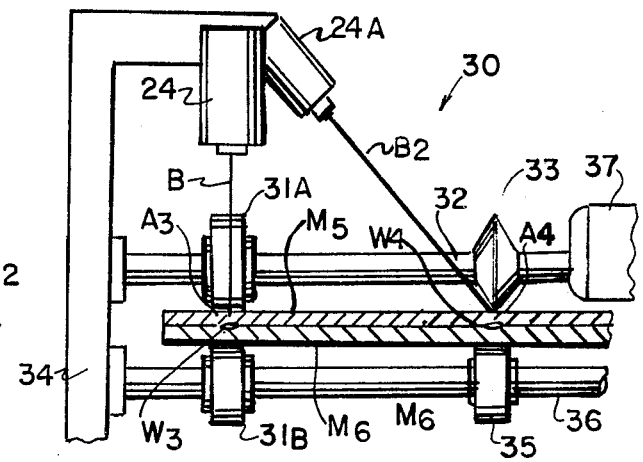

BEAM WELDING APPARATUS AND METHOD

RELATED APPLICATIONS

This is a continuation-in-part of Ser. No. 572,143 filed Apr. 28, 1975 for Beam Welding Apparatus and Method which was a continuation-in-part of Ser. No. 523,865 filed Nov. 14, 1974 as a continuation-in-part of Ser. No. 506,887 filed Sep. 17, 1974 all abandoned.

SUMMARY OF THE INVENTION

This invention relates to a method for welding by means of intense radiation such as a beam of radiation generated by a laser or electron gun. In particular, the invention is directed to a welding process in which an intense beam of radiation is directed against a first member which first member abuts a second member wherein the beam serves to melt or vaporize and bore a hole through at least a portion of the first member and to heat or melt a portion of the second member aligned with the hole formed in the first member by the beam so as to effect the welding of the two members together thereafter by fusion of their materials.

Radiation beams such as electron beams or laser generated coherent light beams have been employed to weld members together but have heretofore been limited in their application to seam or butt welding wherein the radiation beam is initially directed against either or both the two members to be welded at or near the interface of abutment. This physical arrangement limits such welding procedure to butt welding or lap welding wherein portions of both members are directly exposed to the radiation.

Accordingly, it is a primary object of this invention to provide a new and improved a method for welding by means of a radiation beam.

Another object is to provide a method of welding with intense radiation and pressure wherein the radiation is operable to heat soften the members to be welded and to condition both members whereby the material of both may be fused together with force applied thereto.

Another object is to provide a continuous welding a method for joining two sheets or otherwise shaped members together by passing same between powered rolls and controllably directing one or more beams of radiant energy against either or both said sheets whereby the sheets are continuously driven together, and welded by the combined action of the rolls and the heat of the radiant energy.

Another object is to provide a method for welding two abutted members together wherein intense beam radiation is employed to melt a portion of one of the members and to move at least a portion of the melted material to permit further radiation to heat and render a portion of the material of the other member aligned therewith in a weldable condition and to effect welding of the two members.

Another object is to provide a method for welding two or more members together by means of an intense radiation beam intersecting either or both the members and using auxiliary force applying means cooperating with the radiation beam for effecting the welding of the two members.

With the above and such other objects in view as will hereafter more fully appear from studying the accompanying Specification and drawings, the invention consists of the novel constructions, combinations and arrangements of parts and methods so disclosed, but it is to be understood that changes and variations may be resorted to which come within the purview of the claims allowed without departing from the spirit and nature of the invention.

In the drawings:

FIG. 1 is a side view of a first form of welding apparatus;

FIG. 2 is a cross-sectional view of one type of weld produced by apparatus of the type shown in FIG. 1 and FIG. 3 is a cross-sectional view of another type of weld;

FIG. 4 is a side view of another type of beam welding apparatus;

FIG. 5 is an end view of a beam welding apparatus employing auxiliary rolling means to effect the weld;

FIG. 6 is an end view of another type of beam welding apparatus employing rollers and radiation to effect a weld;

FIG. 7 is a side view with parts broken away for clarity of a beam welding apparatus employing an auxiliary welding tube and FIG. 8 is a side view showing a modified embodiment similar to the devices shown in FIGS. 5 and 6.

In FIG. 1 is shown an apparatus 10 which is operable for welding two abutted members denoted M1 and M2 together. Portions of the members M1 and M2 are shown secured to and retained by a clamping device 12 which forms part of a support 11 for predeterminately supporting the members with respect to a radiation beam generating device such as a laser or electron gun. The radiation beam generating device is located within a housing 14 which is predeterminately located with respect to the support 11 by means of a structure 13 such as an arm or column which is secured at one end to support 11 and at its other end housing 14.

The radiation generating device located within housing 14 is operable to generate an intense beam of radiation, denoted B, and to direct same against the outer surface of member M1 which is exposed directly thereto. Members M1 and M2 may comprise a thermoplastic material such as metal or a thermoplastic polymer, different thermoplastic materials which will melt when heated and solidify when cooled in such a manner that when the materials of the two members are properly heated and melted and then solidified thereafter, they will fuse together to form a weld therebetween.

In FIG. 2, the radiation of the beam B is shown as being operable to melt at least a portion of the material of member M1 which is intersected by the beam and to form a cavity or hole 16 therein either as a result of forcing the molten material of member M1 outwardly or away from the original area intersected by the beam or by vaporization of at least a portion of the intersected material.

Welding procedures utilizing the apparatus illustrated in FIGS. 1 and 2 are provided as follows:

I. In a first welding procedure, the outermost member M1 receives radiation directed against a limited, spot-like area A thereof and the radiation serves to bore a hole completely through the member M1 by vaporizing the material thereof so that the radiation may directly intersect and melt a portion of the material of member M2 which is in direct alignment with the hole bored in member M1. The radiation also serves to melt a portion of the material of member M1 in the vicinity of the hole which melted material fuses with the material of M2 which is melted by the beam and, when the two materials cool and solidify, a spot weld is provided therebetween.

II. In a second procedure, the radiation beam B serves to vaporize a portion of the material of member M1 which is in direct alignment therewith while only melting material of member M1 below the vaporized portion and close to material of member M2. Sufficient heat is transferred from the beam, not only to melt material of member M1 which is adjacent to member M2 but also to sufficiently heat material of member M2 to cause it to fuse with the melted material of member M1 and to effect a spot weld between the two members.

III. In a third procedure, the beam B is generated at sufficient intensity and is of such a characteristic that it not only serves to melt a portion of the material of member M1 which it intersects but also operates to cause the melted material thereof to spread out and flow outwardly therefrom to provide a cavity or hole through member M1 of such a characteristic as to permit sufficient heat from the beam to be transferred to member M2 so as to effect a spot weld between the two members.

In the three procedures presented above, reference is made to spotwelding which may be effected by generating intense pulses of light radiation or electron beam radiation and directing same against the selected portion or portions of the outermost of the two members to be welded. The pulsed radiation may be generated while the members and beam are stationary or while either is moved to effect a scanning sweep of the radiation across a selected portion of the outermost member so as to effect a somewhat elongated type of weld between the two members. In a fourth type of welding procedure, two members such as sheets of weldable material are abutted together and the radiation beam B is generated either continuously during the welding operation or for an extended period of time as the beam scans the outermost member and effects a line type weld therebetween by one of the described welding processes.

FIG. 2 illustrates the welding procedure involving a partial vaporization or melting of the outermost member M1 to form a cavity 16 therein and the transfer of heat through the remaining portion of the outermost member to the surface of the member M2 therebeneath to effect the welding operation and spot weld W1.

FIG. 3 illustrates the welding procedure wherein the outermost member is completely bored through by the beam forming hole 16' and a portion MA of the melted material thereof flows against and fuses with a portion MB of the material of the innermost member which is melted by the beam to effect the weld W2.

In FIG. 4 is shown modified form of the invention wherein work engaging and compressing means cooperates with a radiation beam in welding two abutted members such as thermoplastic or metal sheet materials denoted M3 and M4. The apparatus 20 comprises a support 21 and a retaining or prepositioning means 22 supported by the support for retaining or prepositioning the two abutted members on the support. A radiation beam generating means 24 is supported above the support 21 by means of a frame or column 23 and operates to generate and direct a beam B of intense light or electron beam radiation against the outermost member M3 in the vicinity of a device 25 such as a solenoid with an actuator 26 which is operable to compress the two members together at least in the vicinity of the portions of the two members which are intersected by the beam of radiation.

The work compressing means may also comprise one or more powered rollers 28 which are operable to receive, compress and drive the two members M3 and M4 therebetween in a manner such that the compressive force applied by the roller or rollers cooperate to weld the two members together as they are line or spot heated by the radiation of the beam B. Accordingly, the radiation beam B may be directed against one of the two members M3 and M4 along an area thereof which is immediately adjacent the roller or wheel or that roller which engages the surface of the member facing the direction of the beam as shown in FIG. 5.

For the procedure which employs a roller or wheel or a pair of rollers which are power rotated to engage and drive the two members M3 and M4 therebetween, the radiation beam B may be continuously or intermittently generated to effect a line weld or a series of spot welds along a predetermined portion of the assembly. Where the engaging member is a bar or tool which is intermittently operated to engage and disengage the two members together, the beam may be generated intermittently in synchronization with the operation of the compression means and the means driving the two members with respect to the beam generating means so as to effect the spot welding of the two members together.

In FIG. 5 is shown one of a pair of powered rollers or wheels denoted 31A and 31B forming part of an apparatus 30 which includes means for driving two members M5 and M6, to be welded, together therebetween. The roller or wheel 31A is supported by a shaft 32 which is driven by a gear motor 37 supported by the frame or bed 34 of the welding conveying apparatus 30. Two welding techniques are illustrated in FIG. 5, including one in which the welding beam B is directed against an area A3 of the upper sheet M5 which area is immediately in front of the compression wheel 31A wherein the beam B is projected along an axis which is at right angles to the axis of rotation of the wheel thus effecting a spot or line weld W3 between the two sheets which is aligned with the two wheels 31A and 31B. The second welding technique illustrated to the right of FIG. 5 employs an intense radiation beam B2 generated by a laser or electron gun which is directed at an angle to the rotational axis of a tapered wheel 33 and intersects an area A4 of the upper sheet M5 immediately in front of or to the side of the peripheral surface of wheel 33 contacting the upper sheet or plate M5. A wheel 35 supported by shaft 36 beneath the sheets is aligned with and cooperates with wheel 33 in compression welding the beam heated materials of the sheets together.

In FIG. 6, two rollers or wheels denoted 38 and 40 are spaced apart from each other and mounted on shafts 39 and 41 or on a common shaft which is intermittently or continuously driven by a gear motor. The laser or electron gun is located and operable to direct its beam between the two wheels at an angle to the upper surface of the outermost member M7 to be welded to sheet M8. The pressure exerted against the two members by the two wheels and a cooperating roller 42 is sufficient to compression weld the two members engaged therebetween and said cooperating roller or sheets, when heat is intermittently or continuously applied by means of the intense radiation beam to the area between the two wheels. The radiation beam generating device in housing 24 may also be operable to direct the beam $B_2$ against the wheel 33 to heat the wheel and to transfer heat therethrough to the work.

In FIG. 7 is shown an apparatus 40 which includes a support or base 41 for two members denoted M9 and M10, such as two sheets or sheet-like portions or members, which are supported in facewise abutment with each other on the upper surface 42 of the base 41. A housing 24 containing a laser or electron gun is supported at the upper end of an elongated rigid tube 44, the lower end rim portion 45 of which tube is intermittently driven by a motor 50 which intermittently drives the support 47 for housing 24 to cause rim 45 to intermittently engage the upper surface of outermost workpiece M9 and compress same against member M10 on the upper surface 42 of support 41 with sufficient force to pressure weld the two members together when heated by means of an intense radiation beam B generated by the device within housing 24 and directed along the inside passageway 46 of tubular member 44. Motor 50 is intermittently operated to drive tubular member 44 towards and away from the member M9 to be welded in synchronization with the operation of the radiation beam generating device in housing 24 and a device employed to intermittently feed the members to be welded across the upper surface 42.

In FIG. 8 is shown a modified form of the embodiments of FIGS. 5 and 6 wherein two members designated M12 and M13 such as metal or plastic sheets, plates, structural members or other shapes are driven between powered rolls 52 and 54 which are supported on shafts 53 and 55 supported by a base 56 and welding is effected by the combined heating action of a beam B of intense radiation which is directed close to the roll 52 against the upper surface of M12 immediately in front of the roll. The beam B serves to heat and melt or render bondable the materials of members M12 and M13 immediately in front of the rolls 52 and 54 as they rotate, drive and compress the two members together. The beam B is shown directed at about a forty-five degree angle to the upper surface of member M12 and just missing the surface of roll 52 although it may be directed against the interface of the roll and sheet or member M12 wherein it heats the roll but does not melt or vaporize the material thereof and thereby serves to effect the welding action wherein heat is transferred from the roll to sheet or member M12 by reflection and conduction therefrom. As set forth above, the beam B may be continuously or intermittently generated to provide a continuous weld line or a series of spot welds between the two members M12 and M13.

In a modified form of the embodiment of FIG. 8, it is noted that two or more intense radiation beams may be simultaneously directed at the area or areas to be welded from above and/or either or both sides of the upper surface of M12 in the vicinity adjacent to and at the sides of the roll 52 and/or both the rolls engaging the sheets or members.

In yet another form of the invention, the apparatus illustrated may be modified to permit the unwelding of two welded members for disassembly thereof. For example, the beam or a plurality of intense radiation beams as described may be applied to a weld or area adjacent a weld to heat and melt the material thereof of to permit the members to be pulled apart by automatically operated means. In a modification of this process, the head and/or shank of a fastener such as a rivet or screw may be beam welded or otherwise welded to a workpiece to retain it in assembly with one or more workpieces or prevent its unthreading. Removal of the fastener to permit work disassembly may be effected by applying a force to the work or fastener, such as a pulling action with a special tool while an intense radiation beam is applied to the spot or area weld to heat and render same in a condition whereby the weld may be separated or broken by said pulling action. The beam generator may be part of the pulling tool.

Spot welding of a portion of the periphery of the head of a machine screw, bolt, rivet or other type of fastener to the surface of work which the head is clampingly engaged against or is retaining another member thereagainst may be effected by directing a pulse of intense radiant energy from a laser or electron gun against either the peripheral edge portion of the head and/or the work in a manner to melt a small portion of the head and/or work and to effect a fusion bonding or welding of the head to the work which bond or weld is of such a characteristic that it will prevent the fastener shank from turning in a threaded hole in the work and loosening or coming out of the work yet which weld is capable of being broken or destroyed when a tool such as a wrench is applied to the head or shank of the fastener such as in loosening same, to permit the fastener to be removed from the work as in a dissassembly operation. Such a spot weld or group of spot welds may also be provided as a supplement or replacement for the head and work weld between the portion of the shank of the fastener which protrudes from the opposite side of the work or between the fastener shank and a second fastening component such as a nut which is threadably assembled to the other end of the shank to retain the two in assembly to prevent their unscrewing until a wrench, set of wrenches or wrench and screwdriver are employed to break or sever the spot weld or welds by holding and/or turning the shank and nut or washer. In the case where it is desired to effect a stronger bond between the fastener and the work or nut or where fluid pressure sealing across the shank or head of the fastener is desired, the electron gun or laser generated beam may be scanned to intersect the periphery of the head or shank of the fastener and to effect a line weld between the head and work or the shank and work which weld effect a fluid pressure seal completely across the head and/or shank. Such a weld may or may not be capable of being broken by a turning or wrench action as described depending on the fastening action desired. To effect such a spot or line weld, the beam may be directed to intersect both the fastener's head or shank and the work material immediately adjacent thereto by directing the center of the beam at the interface between the two and/or causing the beam to scan back and forth across said interface one or more times to melt limited portions of both to effect such a spot weld.

In yet another form of the invention, a laser electron gun beam may be pulsed or otherwise operated on a more extended basis to melt coating material disposed against a fastener and/or the work adjacent the fastener and to thereby effect a spot weld between the coating and second coating or the base material of the other member adjacent thereto or to effect a seal and a locking action between the two members as described. The coating may be a thermoplastic resin or a metal having characteristics such as high corrosion resistance or capable of providing a weld which may be destroyed by a wrenching action as desribed.

In still another form, one or more spot welds may be so applied by a laser or electron gun to the threads of both the shank of a fastener and the threaded hole in a workpiece in which said fastener is turned or between the threads of a nut and those of the shank of a fastener on which said nut is retained to provide a thread locking action capable or being destroyed or broken by whenching or turning one with respect to the other.

In another form, a spot weld, series of such spot welds arranged in a line array or otherwise or a line weld may be effected by a laser or electron gun as described between two sheet metal components such as the lid or top of a container of metal or plastic can and such weld may be of such a characteristic that it may be destroyed or torn by a pulling action between the two members so welded or by a twisting or pushing action operable to pull the two welded members apart and sever the weld. Such a weld capable of being torn or destroyed by hand may be provided between two sheets of plastic such as film, two sheets of metal such as aluminum sheet or foil or a combination of metal and plastic sheet materials.

Still other forms of the instant invention include the following:

(A) In the embodiments illustrated in FIGS. 4–6 and particularly those shown in FIGS. 5 and 6 wherein one or more pairs of rolls or wheels cooperate to compressively engage the sheet-like members to be welded and drive same therebetween, the radiant energy beam or beams may operate to merely heat the localized area of one of the sheets intersected thereby immediately in front of one of the rolls or wheels to a degree to facilitate pressure welding by means of the driven rolls or wheels.

(B) The laser or electron beam so generated may operate to render the sheet which it intersects molten in the immediate vicinity of the periphery of the roll or wheel engaging same. Such molten condition may be effected along a narrow band-like portion of the sheet intersected by the beam if the beam is generated continuously or along selected spot-like portions of the intersected sheet which becomes welded to the other sheet by the combined pressure of the aligned rolls or wheels.

(C) The beam so generated may also be operable to intermittently or continuously vaporize a portion of the sheet which it intersects which may include the entire thickness thereof or only a portion of said thickness so as to permit sufficient heat to be transferred through the remaining portion of the sheet to the other sheet to effect welding under the combined operation of the radiant energy heating of the sheet intersected thereby and the adjacent sheet and the pressure applied between the rollers or wheels.

(D) The beam or beams so generated may be directed against the peripheral portion of a wheel or roller, such as rolls 31A and 31B or wheels 33 and 35 of FIG. 5 or wheels 38 and 40 and roller 42 of FIG. 6. The heating action by the beam on the rolls or wheels may be sufficient to heat the portions of the sheet intersected by the roll or wheel so heated to render it welded to the adjacent sheet when the two sheets are compressed together between the rolls.

(E) In yet another embodiment, the rolls or wheels illustrated in FIGS. 5, 6 and 8 of the drawings may be replaced by one or more pairs of aligned endless flight, chain or belt conveyors which are driven into engagement with the sheets driving same therebetween wherein the beamed radiant energy is directed against the outer surface of either or both sheets where they enter the bite of the endless conveyors. Here again, the beam or beams may be directed continuously or intermittently immediately adjacent the endless conveyors so that the combined action of the heat generated by the radiant energy and the pressure exerted by the endless conveyor belts or flights or rolls engaging same to compress the sheets together will be sufficient to effect line or spot welding of the sheets depending on how the radiation beam is generated.

I claim:

1. A method of welding comprising:
   driving first and second members between powered endless surface means into abutment with each other with at least portions of the abutting portions of each member engaged by said endless surface means and wherein portions of the materials of said engaged portions of said first and second members are heat softenable and are of a characteristic such that said heat softenable portions will become welded together when compressed and heated to a weldable condition and are thereafter cooled to a set condition,
   generating an intense beam of radiation and directing said radiation beam against a surface of at least one of said members along an axis which intersects the other member near the interface of the abutment of the two members,
   transferring heat from said beam to condition abutting portions of the materials of said first and second members in the vicinity of said endless surface means for welding and intermittently operating an auxiliary clamping means to engage and disengage said first and second members so as to intermittently apply compressive force thereto and to cause portions of the materials of the two members to intermingle with each other, and
   solidifying the intermingled materials of said first and second members to effect a fusion welding to the two members together in the vicinity where said beam intersects said one member.

2. A method in accordance with claim 1 wherein said first and second members are respective sheets of metal and said intense beam of radiation is directed against an outer surface of one of said metal sheets after said sheets are driven together.

3. A method of welding comprising:
   driving first and second members between powered endless surface means into abutment with each other with at least portions of the abutting portions of each of said members engaged by said endless surface means and wherein portions of the materials of the engaged portions of said first and second members are heat softenable and are of a characteristic such that said heat softenable portions will intermingle with each other and become welded together when heated to a weldable condition and thereafter cooled to a set condition,
   generating an intense beam of radiation and directing said radiation beam against said endless surface means to heat said endless surface means and transfer heat therefrom to said first and second members,
   causing portions of the materials of said first and second members engaged between and heated by said endless surface means to become heat softened and to intermingle with each other, and
   solidifying the intermingled materials of said first and second members to effect a fusion welding of the two members together in the vicinity of said endless surface means.

4. A method in accordance with claim 3 wherein said endless surface means comprises at least one powered roller compressively engaging at least one of said first and second members against the other and said intense radiation beam is directed against said powered roller to heat said powered roller and transfer heat energy therethrough to said first and second members.

* * * * *